United States Patent [19]

Jones

[11] 4,092,502

[45] May 30, 1978

[54] TELEPHONE ATTACHMENT FOR PLUG-IN HEADSET CAPABILITY

[76] Inventor: Ronald B. Jones, 901 6th St. SW., Washington, D.C. 20024

[21] Appl. No.: 738,365

[22] Filed: Nov. 3, 1976

[51] Int. Cl.² .............................................. H04M 1/02
[52] U.S. Cl. .................................. 179/100 R; 179/81 B
[58] Field of Search ............ 179/81 R, 100 R, 182 R, 179/183, 1 C, 2 C, 1 PC, 146 R, 81 B

[56] References Cited

U.S. PATENT DOCUMENTS

| | | | |
|---|---|---|---|
| 2,069,038 | 1/1937 | Labaugh | 179/81 R |
| 3,662,118 | 5/1972 | Phoenix | 179/81 B |
| 3,748,397 | 7/1973 | Jones | 179/1 PC |

FOREIGN PATENT DOCUMENTS 212,297  11/1940  Switzerland ..................... 179/100 R

OTHER PUBLICATIONS

*Telephony*, Jul. 11, 1970, p. 7.

*Primary Examiner*—William C. Cooper
*Assistant Examiner*—Joseph A. Popek
*Attorney, Agent, or Firm*—Herman L. Gordon

[57] ABSTRACT

An adaptor to be used with a standard telephone to enable a plug-in headset to be used therewith without interfering with normal usage of the telephone and to allow usage without the necessity of employing the normal telephone handset, enabling free use of the user's hands. The attachment includes a latching pushbutton which operates a switch assembly which duplicates the function of the telephone hook switch assembly. The attachment is mounted on a bracket which is clampingly engageable with the telephone and which carries the jacks for the plug-in headset and the latching push button and substitution switch assembly. The attachment allows simultaneous use of the plug-in headset and the normal telephone handset by two persons for a conference call.

9 Claims, 7 Drawing Figures

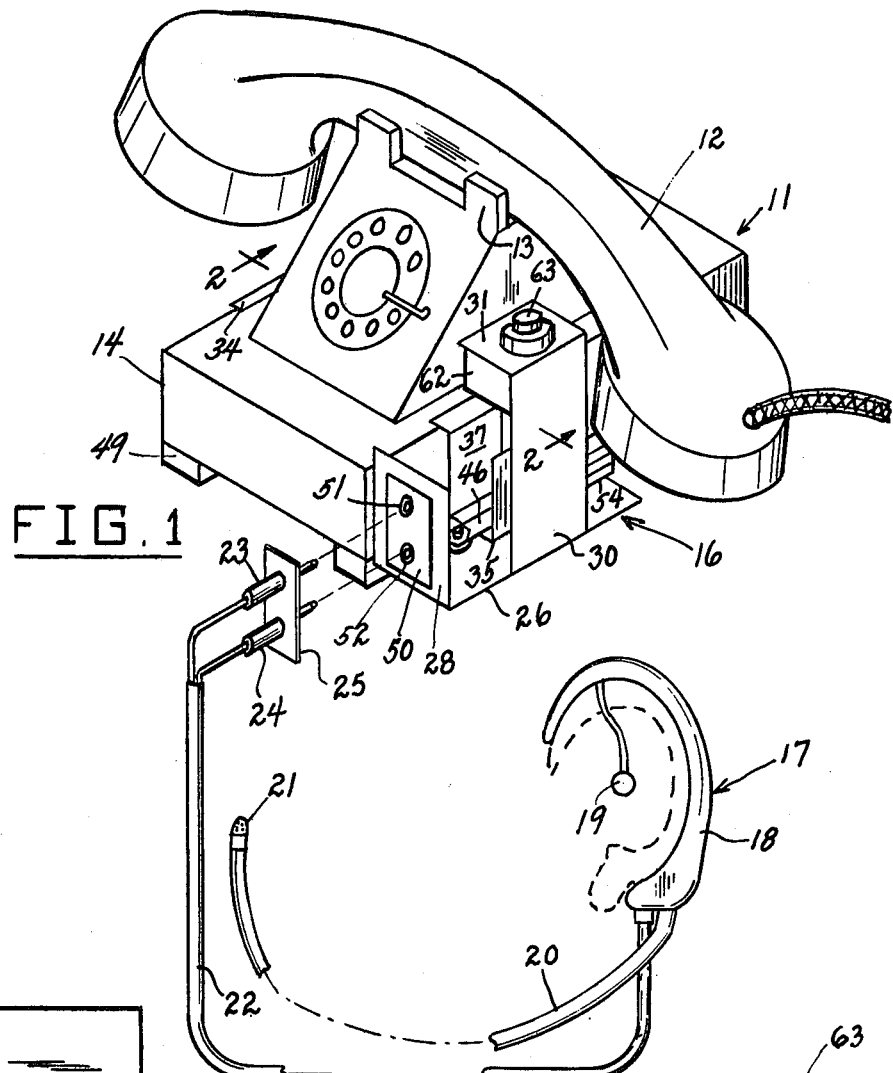
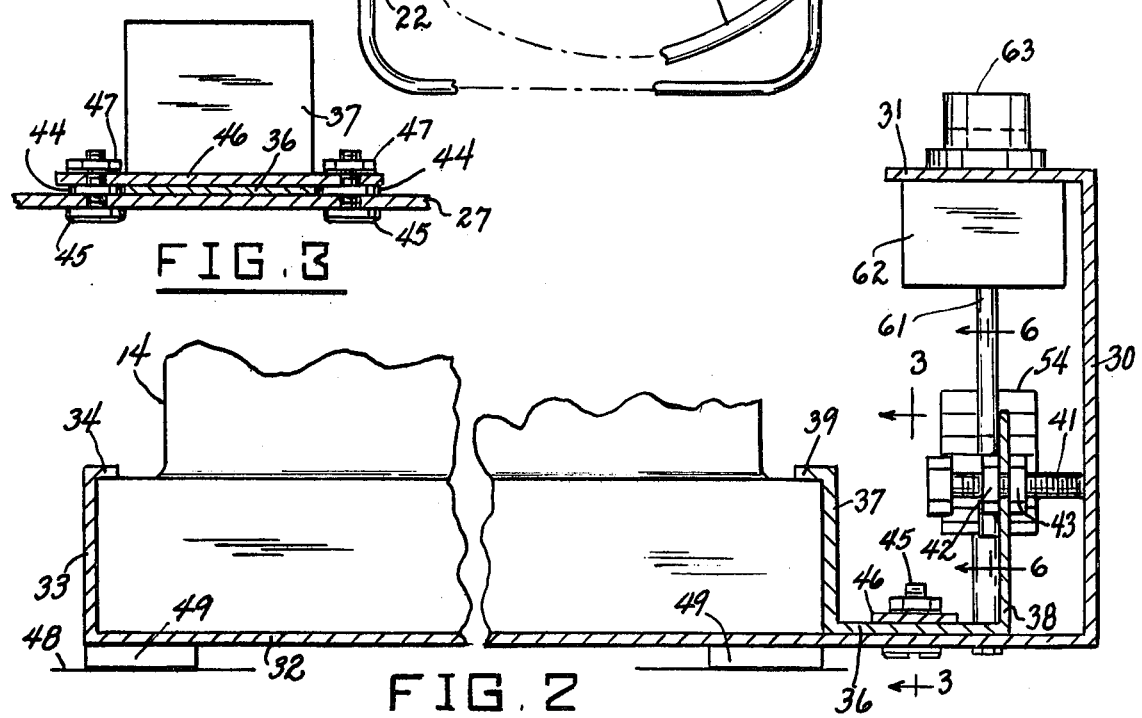

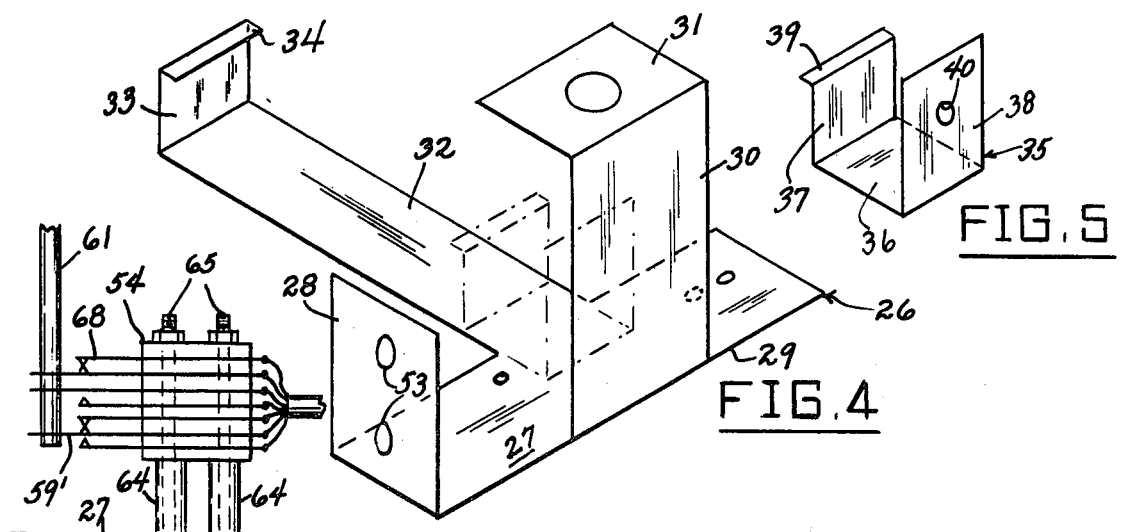
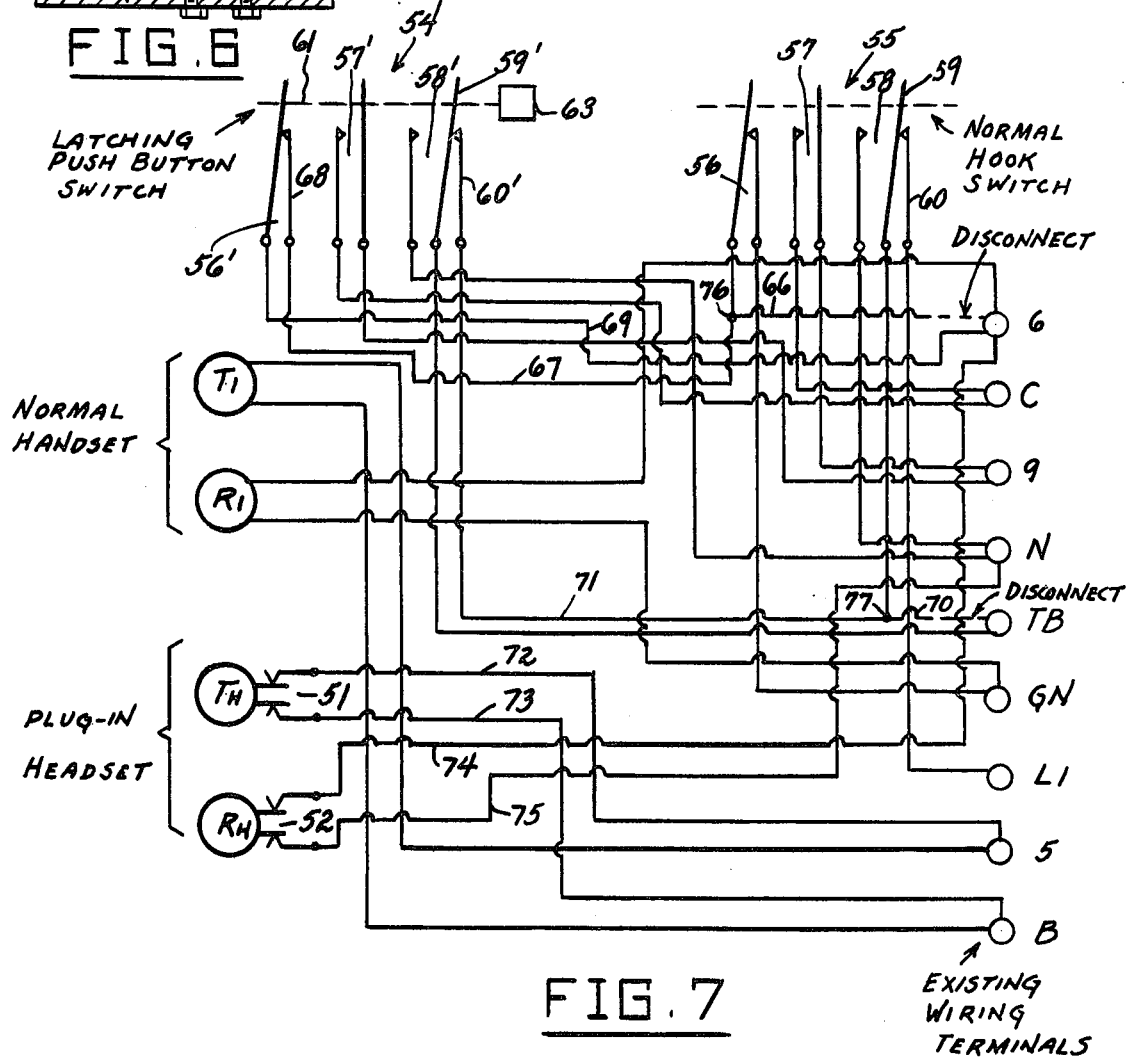

TELEPHONE ATTACHMENT FOR PLUG-IN HEADSET CAPABILITY

FIELD OF THE INVENTION

This invention relates to convenience attachments for telephones, and more particularly to an attachment for a standard telephone to enable a headset to be used with the telephone in place of the normal hand-held transmitter-receiver thereof.

BACKGROUND OF THE INVENTION

In standard telephones it is common to employ a hand-held transmitter-receiver which must be picked up and held during use. Normally this transmitter-receiver rests on a cradle which includes a plunger device operatively connected to a hook switch assembly. The hook switch assembly controls various sets of connections, including connections to the associated line circuit, holding the talking circuit open and the ringing circuit closed while the transmitter-receiver is resting on the cradle. When the telephone rings, the user picks up the transmitter-receiver, allowing the hook switch assembly to close the talking circuit connection, open the bell-ringing circuit, and, in various designs of telephones, to suitably activate or enable other circuits. To use a standard telephone it is necessary to employ at least one hand for removing and holding the transmitter-receiver, thus having only one hand free for taking notes of for performing other duties. Also, in order to include another nearby person in the conversation, namely, to carry on a conference call, it is necessary to employ an extension telephone, which frequently is not available in a convenient nearby location.

SUMMARY OF THE INVENTION

Accordingly, a main object of the invention is to provide a novel and improved telephone attachment for providing plug-in headset capability, enabling a headset to be utilized as an alternative to the standard hand-held transmitter-receiver of a telephone, the attachment being easy to install, enabling the user to have complete freedom of both hands while carrying on a telephone conversation, enabling the user to duplicate the release of the telephone hook switch by merely operating a latching push button provided on the attachment, and enabling another person to participate in the conversation, if so desired, by merely picking up and using the standard transmitter-receiver of the telephone.

A further object of the invention is to provide a headset capability conversion attachment for a standard telephone which employs relatively inexpensive components, which is compact in size, which can be installed quickly and without requiring special tools, which is neat in appearance, which requires no permanent mechanical modification of the components of the associated telephone, which provides the ability for a user to assume a comfortable position without encountering the fatigue of manually holding the transmitter-receiver or for pressing it to his ear by using his shoulder, which enables the user to move about, being limited only by the length of the headset cord, enabling the user to leave the area between calls by merely unplugging the headset cord from the attachment, in which case the associated telephone can still operate normally, and enabling the user to duplicate hook switch off-hook and on-hook action by merely actuating a latching push button provided on the attachment.

BRIEF DESCRIPTION OF THE DRAWINGS

Further objects and advantages of the invention will become apparent from the following description and claims, and from the accompanying drawings, wherein:

FIG. 1 is a perspective view showing a typical telephone provided with an improved plug-in headset attachment constructed in accordance with the present invention.

FIG. 2 is an enlarged fragmentary vertical cross-sectional view taken substantially on the line 2—2 of FIG. 1.

FIG. 3 is a fragmentary cross-sectional detail view taken substantially on the line 3—3 of FIG. 2.

FIG. 4 is an enlarged perspective view of a sheet metal stamping forming the main supporting body of the attachment shown in FIG. 1.

FIG. 5 is an enlarged perspective view of a clamping slide member employed in the attachment of FIG. 1.

FIG. 6 is a fragmentary cross-sectional detail view taken substantially on the line 6—6 of FIG. 2, through the substitution switch assembly employed with the attachment.

FIG. 7 is a wiring diagram showing how the electrical elements of the attachment of FIG. 1 may be connected to the telephone, in relation to the existing wiring terminals associated with the hook switch assembly and the normal transmitter-receiver.

DESCRIPTION OF A PREFERRED EMBODIMENT

Referring to the drawings, 11 designates a typical standard telephone, the telephone having a transmitter-receiver, or handset, 12 which normally resets on the cradle portion 13 of the main body 14 of the telephone. Designated generally at 16 is an attachment according to the present invention, for enabling a plug-in headset 17 to be used with the telephone.

The headset 17 is of a conventional type comprising an ear-engaging main supporting member 18 on which is carried a miniature receiver earphone 19 engageable in the wearer's ear. A tubular semi-rigid support element 20 is secured to the bottom portion of the main supporting member 18 and extends forwardly therefrom, being provided at its free end with a transmitter microphone 21, the semi-rigid tubular support being sufficiently flexibly adjustable to suitably position the microphone 21 adjacent the wearer's mouth. The conductor pairs associated with the receiver earphone 19 and the transmitter microphone 21 are carried in a flexible cable 22 and terminate in respective conventional phone plugs 23 and 24 mounted in spaced parallel relationship in a common supporting plate 25.

The attachment 16 comprises a main supporting body 26 of sheet metal, or the like (see FIG. 4). Said body 26 comprises a rectangular main base plate portion 27 provided at its front end with an upstanding vertical flange 28 and at a side edge 29 with a substantially higher side vertical flange 30 having a horizontal top arm portion 31 overlying base plate portion 27. Formed integrally with base plate portion 27 at its opposite side and extending laterally therefrom is a horizontal arm 32 adapted to underlie a telephone body 14 and having an upstanding vertical end stop arm portion 33 provided with an inturned horizontal top retaining flange 34.

A generally U-shaped clamping slide member 35 (see FIG. 5) is adjustably secured on plate portion 27, opposing stop arm portion 33. Member 35 has the horizontal bight portion 36 and respective vertical arms 37 and 38. Arm 37 has a top flange 39 and opposingly faces stop arm portion 33. Arm 38 is apertured at 40 to receive a pressure-exerting bolt 41 (see FIG. 2) engageable against vertical flange 30 to develop clamping force on the base portion of the body 14 of a telephone engaged between arms 33 and 37. As shown in FIG. 2, bolt 41 may be threadedly engaged through a supporting nut 42 rigidly secured, as by welding, to the inside surface of arm 38. A locknut 43 may be provided on the bolt 41 at the outside surface of arm 38 to lock the clamping adjustment.

Bight portion 36 is slidably adjustable between spacer washers 44, 44 on bolts 45, 45 engaged through plate portion 27 (see FIG. 3). Bolts 45, 45 extend through the opposite end portions of a retaining strap member 46 transversely overlying bight portion 36. Securing nuts 47, 47 are provided on bolts 45, 45, with lock washers between said nuts and member 46.

As shown in FIG. 2, the horizontal arm 32 is engageable beneath the telephone main body 14 and is supported in slightly elevated position above the table or other supporting surface for the telephone, shown at 48, by the corner supporting pads 49 of the telephone.

A double jack unit 50 is suitably secured on flange 28, carrying respective phone jacks 51, 52 extending through spaced apertures 53, 53 provided in flange 28, the jacks being spaced to receive the respective phone plugs 23, 24.

Mounted on plate portion 27 is a multiple-section leaf spring switch assembly 54 whose switch sections match those of the hook switch assembly contained in the telephone 11. Thus, the hook switch assembly, shown at 55, of the typical telephone 11 (see FIG. 7) may comprise a normally closed switch section 56, a normally open switch section 57, and a double-throw switch assembly 58 including a pole 59 and a contact 60 normally engaged thereby. Elements 59–60 may control the ringing circuit, opening said circuit when the handset 12 is lifted, whereas switch section 56 may open a shunt across the telephone receiver $R_1$ when the handset is lifted. Switch section 57 may close the loop circuit when the handset is lifted. The substitution switch assembly 54 contains respective switch sections 56', 57' and 58' which are respectively functionally the same as the hook switch sections 56, 57 and 58. Thus, section 56' is normally closed, section 57' is normally open, and pole 59' of double-throw section 58' normally engages a contact 60'.

Substitution switch assembly 54 is operated by a vertical plunger 61 controlled by a conventional latching push button assembly 62 secured beneath top arm portion 31 and having an operating push button 63, said push button being exposed above arm portion 31, as shown in FIG. 1. As shown in FIG. 6, the multiple-section leaf spring switch assembly 54 is secured on spacer sleeves 64, 64 on plate portion 27 by bolts 65, 65, with the vertical plunger 61 operatively connected to the movable leaves of the switch assembly. When latched down, by the depression of push button 63, plunger 61 places substitution switch assembly 54 in the same switching configuration as hook switch 55 assumes when the handset 12 is lifted. Under these conditions, button 63 remains depressed. When button 63 is again pressed, it releases plunger 61 and allows the button and other parts of the switch assembly 54 to return to their normal configuration, corresponding to replacement of the handset 12 on its cradle.

In installing the attachment 16, the electrical elements of the attachment are connected to the telephone at the existing terminals of the telephone employed for the connections of the hook switch assembly 55 and the transmitter-receiver elements $T_1$, $R_1$. Thus, as shown in FIG. 7, in the typical standard telephone 11, the connections are at respective screw terminals 6, C, 9, N, TB, GN, $L_1$, 5 and B, found on terminal boards accessible by unscrewing the bottom cover of the telephone. The connections of the attachment 16 are made to these terminals or in relation thereto, following these rules:

a. A normally open switch section of the substitution switch assembly 54 is connected to the screw terminals for the corresponding normally open switch section of the hook switch assembly 55, namely, corresponding normally open switch sections are connected in parallel.

b. A normally closed switch section of the substitution switch assembly 54 is connected so as to be in series with the coresponding normally closed switch section of hook switch assembly 55; for example, in FIG. 7, the wire 66 leading from the pole of section 56 to terminal 6 is disconnected from terminal 6 and is connected at 76 to a wire 67 leading to the stationary contact 68 of section 56'. The pole of section 56' is connected by a wire 69 to terminal 6. Similarly, the wire 70 from pole 59 to terminal TB is disconnected from terminal TB and is connected at 77 to a wire 71 leading to contact 60'. The pole 59' is connected to terminal TB.

c. The jack wires 72, 73 from the headset transmitter $T_H$ jack 51 are connected to the respective corresponding handset transmitter $T_1$ terminals 5, B; the jack wires 74, 75 from the headset receiver $R_H$ jack 52 are connected to the respective corresponding handset receiver $R_1$ terminals 6, N.

A suitable simple manual may be furnished with the attachment, showing the proper terminal connections for various known common designs of telephones with which the attachment may be used. The attachment may be provided with suitably color-coded leads to facilitate quick installation when employing said manual. Most standard telephones have a hook switch unit including at least a set of normally closed (bell ringing) contacts which open when the handset is lifted, and a set of normally open (loop circuit control) contacts which close when the handset is lifted. This type of hook switch configuration can be readily accommodated by the attachment 16. Other more complex hook switch configurations can be accommodated by utilizing a suitably expanded substitution switch pile in the attachment.

The latching push button assembly 62 is a conventional unit similar to Model No. 1890J manufactured by Philmore Manufacturing Co., Inc., New York, N.Y.

As will be apparent from the above description, the device 16 can be easily and quickly installed, and provides headset capability, enabling a headset 17 to be used as an alternative to the use of the standard handset 12. The function of picking up and holding the handset is replaced by momentarily depressing the push button 63 to an "in" position, which causes the button to lock in its depressed position. The user is then "on line" to the other party and has both hands completely free; the user is free to assume a comfortable position without the fatigue resulting from the necessity of holding a handset with one hand or from pressing the receiver to his ear with his shoulder; the user is free to move about the area, with the length of the cord 22 being the only restricting factor; and the user is free to leave the area between calls without removing the headset 17 from his ear, simply by unplugging the headset from the unit 16. Upon completing a call, the user again depresses the button 63, which causes it to release to an "out" position, thereby releasing the telephone line, as would occur when hanging up the handset 12. Installation of the device 16 does not impair normal operation of the telephone 11, and permits normal use of the handset 12, or use of the telephone simultaneously by two persons for a conference call (one person using the handset 12 and the other person using the plug-in headset 17).

Installation of the device 16 does not require drilling any holes or any other permanent mechanical modification of any component of the telephone.

While a specific embodiment of an improved telephone attachment for plug-in headset capability has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In combination with a telephone of the type having a handset provided with a transmitter and receiver and wiring terminals therefor, cradle means receiving said handset and a hook switch operated by the handset when so received and having wiring terminals in the telephone, adaptor means comprising a support including means clampingly engaged with the telephone, said clamping means comprising opposing upstanding flanges on the support, a slide member movably mounted on the support between said flanges, and screw means on the slide member engaging with one of the flanges to exert pressure on the slide member urging it toward the other flange, the body of the telephone being received between the slide member and said other flange, headset jack means on the support for receiving headset plug means, means connecting said jack means to the telephone to establish connections respectively to the terminals of the transmitter and receiver of said handset, two-position substitution switch means on said support having switch sections corresponding to those of the hook switch, manually actuated latchable operating means on said one of the flanges operatively connected to said substitution switch means, and means connecting said substitution switch means to the hook switch terminals of the telephone such that actuation of said operating means simulates hook switch action, whereby to provide off-hook conditions while the handset remains in said cradle means.

2. The structural combination of claim 1, and wherein said manually actuated latchable operating means comprises a push button-actuated latchable plunger assembly having a plunger connected to said substitution switch means.

3. The structural combination of claim 2, and wherein said one upstanding flange has a horizontal top portion, and wherein said latchable plunger assembly is secured beneath said top portion and has an operating push button extending above said top portion.

4. The structural combination of claim 3, and wherein said substitution switch means comprises a multiple-section leaf spring switch assembly mounted on the support beneath said latchable plunger assembly, said switch assembly having a plurality of movable switching leaves, said plunger being connected to said movable switching leaves.

5. The structural combination of claim 4, and wherein said slide member is substantially U-shaped with a horizontal bight portion slidably engaging said support, a retaining strap element transversely overlying said bright portion, and means securing the opposite end portions of said retaining strap element to said support.

6. The structural combination of claim 5, and wherein said slide member has spaced inner and outer upstanding arms, the inner arm opposing said other upstanding flange of the support to exert clamping pressure on the body of the telephone, and wherein said screw means extends through said outer upstanding arm to engage said one of the upstanding flanges of the support.

7. The structural combination of claim 6, and wherein said support is provided with an upstanding further flange transverse to said one flange, and wherein said jack means is mounted on said further flange.

8. The structural combination of claim 1, and wherein the telephone is of the type wherein the hook switch includes at least one normally open switch section and at least one normally closed switch section, wherein said substitution switch means includes a corresponding normally open switch section and a normally closed switch section, and wherein said means connecting the substitution switch means to the hook switch terminals comprises means to connect the normally open switch section of the substitution switch means in parallel with the normally open hook switch section and means to connect the normally closed switch section of the substitution switch means in series with the normally closed hook switch section.

9. In combination with a telephone of the type having a handset provided with a transmitter and receiver and wiring terminals therefor, cradle means receiving said handset and a hook switch operated by said handset when so received and having wiring terminals in the telephone, adaptor means comprising a support, means securing the support to the telephone comprising opposing upstanding flanges on the support, a slide member movably mounted on the support between said flanges, and screw means on the slide member engaging with one of the flanges to exert pressure on the slide member urging it toward the other flange, the body of the telephone being received between the slide member and said other flange, headset jack means on the support for receiving headset plug means, means connecting said jack means to the telephone to establish connections respectively to the terminals of the transmitter and receiver of said handset, manually operated latchable substitution switch means on said support, including an operating member on said one of the flanges, said switch means having switch sections corresponding to those of the hook switch, and means connecting said substitution switch means to the hook switch terminals of the telephone such that actuation of said substitution switch means simulates hook switch action, whereby to provide off-hook conditions while the handset remains in said cradle means.

* * * * *